(12) United States Patent
Lovell et al.

(10) Patent No.: US 8,103,837 B2
(45) Date of Patent: Jan. 24, 2012

(54) SERVICING MEMORY READ REQUESTS

(75) Inventors: Matthew B. Lovell, Longmont, CO (US); Pavel Vasek, Ft. Collins, CO (US); Patrick Knebel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 12/337,008

(22) Filed: Dec. 17, 2008

(65) Prior Publication Data

US 2010/0153659 A1 Jun. 17, 2010

(51) Int. Cl.
*G06F 12/00* (2006.01)
*G06F 13/00* (2006.01)
*G06F 13/28* (2006.01)
*G06F 15/00* (2006.01)

(52) U.S. Cl. ......... 711/151; 711/150; 711/154; 710/112

(58) Field of Classification Search .......... 711/150–151, 711/154; 710/112
See application file for complete search history.

(56) References Cited

U.S. PATENT DOCUMENTS

| | | | |
|---|---|---|---|
| 6,968,418 B2 * | 11/2005 | Wollbrink et al. | 710/310 |
| 7,685,352 B2 * | 3/2010 | Gregg et al. | 710/310 |
| 2007/0005913 A1 * | 1/2007 | Muthrasanallur et al. | 711/157 |
| 2008/0140893 A1 * | 6/2008 | Barrett et al. | 710/112 |
| 2009/0157919 A1 * | 6/2009 | Dodson et al. | 710/57 |
| 2010/0085875 A1 * | 4/2010 | Solomon et al. | 370/235 |

* cited by examiner

*Primary Examiner* — Jared Rutz
*Assistant Examiner* — Ryan Bertram (57) ABSTRACT

Included are embodiments for a method for servicing memory read requests. At least one embodiment of a method includes receiving read requests from the I/O device; testing predetermined fields from the read requests to predict a type of read request; and when the type of request is predicted to be a data read request, then route the read request to a first queue. Additionally, some embodiments include when the type of request is predicted to be a control read request, then route the read request to a second queue, wherein the second queue has a higher priority than the first queue; determining which of the first queue and second queue to read; retrieving at least one of the read requests from the determined queue; and processing the retrieved read request.

15 Claims, 11 Drawing Sheets

SERVICING MEMORY READ REQUESTS

BACKGROUND

In computing environments that utilize peripheral component interconnect express (PCIe) and other packet-based environments, latency may become an issue that hinders processing speeds of requests and data to and from an input/output (I/O) device. More specifically, in at least one nonlimiting example, latency can occur due to processing large and small read requests in a single pipeline. Similarly, in returning data for a request, latency can occur due to conversion of the requested data from a memory controller to the I/O device.

SUMMARY

Included are embodiments for a method for servicing memory read requests. At least one embodiment of a method includes receiving read requests from the I/O device; testing predetermined fields from the read requests to predict a type of read request; and when the type of request is predicted to be a data read request, then route the read request to a first queue. Additionally, some embodiments include when the type of request is predicted to be a control read request, then route the read request to a second queue, wherein the second queue has a higher priority than the first queue; determining which of the first queue and second queue to read; retrieving at least one of the read requests from the determined queue; and processing the retrieved read request.

Also included herein are embodiments of a system for servicing memory read requests. At least one embodiment of a system includes a root complex configured to receive read requests from the I/O device, where the root complex includes discrimination logic for testing predetermined fields from the read requests to predict a type of read request, wherein when the type of request is predicted to be a first type, the discrimination logic routes the read request to a first queue, wherein when the type of request is predicted to be a second type, the discrimination logic routes the read request to a second queue, wherein the second queue has a higher priority than the first queue and arbitration logic configured to determine which of the first queue and the second queue to read, the arbitration logic further configured to retrieve at least one of the read requests from the determined queue. In some embodiments, the root complex is further configured to process the retrieved read request.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

Additionally, this application is incorporated by reference, in its entirety, U.S. application Ser. No. 12/337,013, mailed Dec. 17, 2008 and entitled "Operation of an Input/Output Link."

DETAILED DESCRIPTION

PCI Express (PCIe) main memory read requests can specify a large quantity of data to transfer, up to 4 kilobytes (KB). A root complex that services such a read request often bridges to a coherent system fabric that is cache line-focused. As such, the root complex may fragment the long PCIe request into multiple, cache line size requests on the system fabric. This fragmentation may be performed in a single-threaded fashion. More specifically, for a given PCIe link, one memory read request may be fully-fragmented before the root complex starts to service the next read request from that link. From the perspective of an I/O adapter, the root complex is thus handling the fragmentation and associated cache line requests for each memory in a strictly ordered fashion.

This technique of servicing read requests often causes the root complex to impose a stronger ordering between such requests than required by PCIe. PCIe ordering rules permit reads to be serviced out-of-order (so long as the data return for any given read request is strictly in-order). As a consequence of the single-threading, short control structure reads thus end up waiting for any previous read requests to be fully-fragmented. This increases the latency for servicing the control read and thus negatively impacts overall adapter direct memory access (DMA) performance as the I/O adapter becomes limited in the number of transactions it can have in-flight at any given time.

By providing a mechanism whereby a subsequent control structure read receives service (fragmentation and system fabric request) from a root complex substantially simultaneous with the servicing of earlier read requests, the latency described above can be reduced. So long as a root complex's differentiation between control reads and data transfer reads is accurate, embodiments disclosed herein may permit an adapter to obtain a next control structure while a previous payload transfer is occurring. The end result is higher DMA performance without imposing higher concurrency requirements (e.g., greater than 2 DMA transfers) on adapters.

Similarly, embodiments disclosed herein may be configured for use with a PCIe root complex connected to a coherent system fabric with 64 Byte (64B) cache lines. PCIe Memory Read (MRd) requests may be serviced from a coherent streaming buffer (effectively similar to a read cache). The MRd requests may be fragmented into a plurality of 64B cache line requests. Prior to starting this fragmentation, the MRd request may be examined against operating system programmable thresholds. These thresholds may direct the fragmentation logic to steer the resulting cache line requests to one of two distinct queues within the root complex. Although logic downstream of this fragmentation may be single-threaded, the root complex may be configured to time-multiplex between the first set of queues. Thus, a root complex capable of handling 4 PCIe links may end up implementing 8 internal queues to service MRd requests. The independent queues thus permit shorter MRd requests to receive service earlier in time than they would in previous implementations. Each individual MRd request may be fragmented into one of the available queues, ensuring that all data read returns are provided in a proper order.

The programmable size thresholds permit the root complex to adjust to different control structure sizes. Each PCIe Link can specify a different threshold. In addition, the priority of the two cache line request streams can also be modified on a per-Link basis. By decreasing the effective service time for short control structure reads, embodiments disclosed herein permit a higher level of DMA payload transfer concurrency without increasing adapter complexity.

Similarly, when large amounts of data are transferred to and from an I/O device, embodiments disclosed herein may be configured such that available bandwidth of the packet-based I/O link are utilized in an efficient manner by minimizing the amount of additional (non-data) information transferred across the link.

Additionally, by combining multiple cache lines into a single PCIe packet, header information (often of a fixed size) utilized in every packet is, in effect, amortized over a larger amount of data. In this way, the total amount of header data created and sent to the I/O adapter for the entire memory read request can be reduced significantly and the bandwidth utilization of the PCIe link can be improved.

Figure 1:
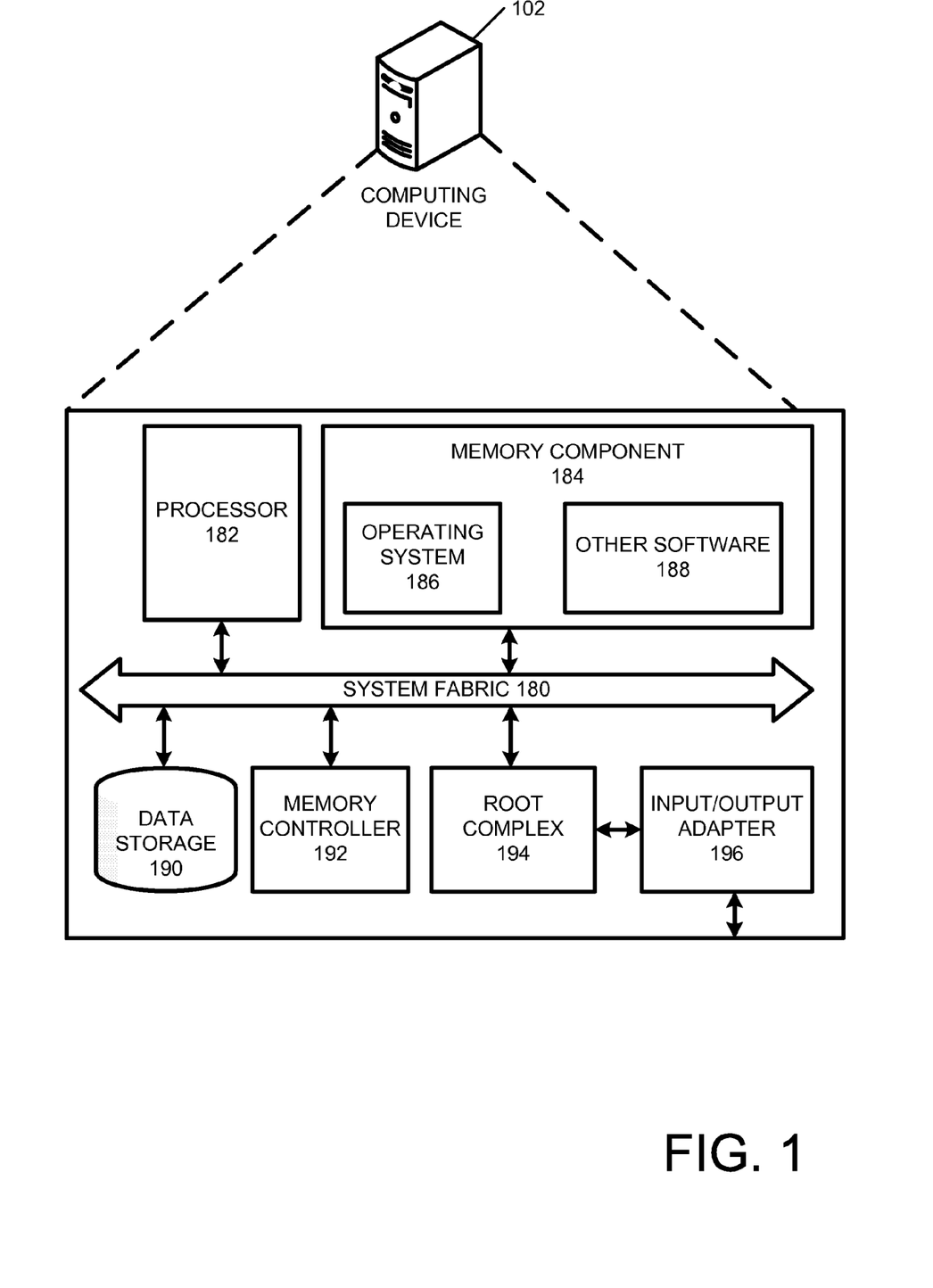
FIG. 1 depicts an exemplary embodiment of a computing device that may be configured to process at least one request from an input/output (I/O) device.

Referring now to the drawings, FIG. 1 depicts an exemplary embodiment of a computing device 102 that may be configured to process at least one request from an input/output (I/O) device. More specifically, although a wire-line device (e.g., a server device) is illustrated, this discussion can be applied to other wireless and/or wire-line devices, as well. According to exemplary embodiments, in terms of hardware architecture, the computing device 102 includes a system fabric 180 that is coupled to a processor 182, a memory component 184, a data storage component 190, a memory controller 192, a root complex 194, and an input/output (I/O) adapter 196 that are communicatively coupled via a system fabric 180. The system fabric 180 can include, for example but not limited to, one or more buses and/or other wired or wireless connections. The system fabric 180 may have additional elements, which are omitted for simplicity, such as controllers, buffers (caches), drivers, repeaters, and receivers to enable communications. Further, the system fabric 180 may include address, control, and/or data connections to enable appropriate communications among the aforementioned components.

The processor 182 may be configured as a device for executing software, particularly software stored in the memory component 184. The processor 182 can include any custom made or commercially available processor, a central processing unit (CPU), an auxiliary processor among several processors associated with the computing device 102, a semiconductor based microprocessor (in the form of a microchip or chip set), a macroprocessor, and/or generally any device for executing software instructions.

The memory component 184 can include any one or combination of volatile memory elements (e.g., random access memory (RAM, such as DRAM, SRAM, SDRAM, etc.)) and/or nonvolatile memory elements (e.g., flash memory, read only memory (ROM), hard drive, tape, CDROM, etc.). Moreover, the memory component 184 may incorporate electronic, magnetic, optical, and/or other types of storage media. One should note that the memory component 184 can have a distributed architecture (where various components are situated remote from one another), but can be accessed by the processor 182.

The software in the memory component 184 may include one or more separate programs, which may include an ordered listing of executable instructions for implementing logical functions. In the example of FIG. 1, the software in the memory component 184 may include an operating system 186 and/or other software 188. The operating system 186 may be configured to control the execution of other computer programs and provides scheduling, input-output control, file and data management, memory management, and communication control and related services. The other software may include data and/or programs that may be utilized, as described herein.

In at least one embodiment, the other software 188 may be configured as a system component and/or module and may also be construed as a source program, executable program (object code), script, and/or any other entity that includes a set of instructions to be performed. When constructed as a source program, other software 188 may be translated via a compiler, assembler, interpreter, or the like (which may or may not be included within the memory component 184) so as to operate properly in connection with the operating system 186.

Additionally, at least one embodiment of the computing device 102 may include one or more of the network interfaces for facilitating communication with one or more other devices. More specifically, a network interface may include any component configured to facilitate a connection with another device. While in some embodiments, among others, the computing device 102 can include the network interface that includes a personal computer memory card international association (PCMCIA) card (also abbreviated as "PC card") for receiving a wireless network card, this is a nonlimiting example. Other configurations can include communications hardware within the computing device 102, such that a wireless network card is unnecessary for communicating wirelessly. Similarly, other embodiments include the network interfaces for communicating via a wired connection. Such interfaces may be configured with universal serial bus (USB) interfaces, serial ports, and/or other interfaces.

If the computing device 102 includes a personal computer, workstation, or the like, the software in the memory component 184 may further include a basic input output system (BIOS) (omitted for simplicity). The BIOS is a set of software routines that initialize and test hardware at startup, start the operating system 186, and support the transfer of data among the hardware devices. The BIOS is stored in ROM so that the BIOS can be executed when the computing device 102 is activated.

When the computing device 102 is in operation, the processor 182 may be configured to execute software stored within the memory component 184, to communicate data to and from the memory component 184, and to generally control operations of the computing device 102 pursuant to the software. Software in the memory component 184, in whole or in part, may be read by the processor 182, perhaps buffered within the processor 182, and then executed.

One should also note that while the description with respect to FIG. 1 includes the computing device 102 as a single component, this is a nonlimiting example. More specifically, in at least one exemplary embodiment, the computing device 102 can include a plurality of servers, personal computers, telephones, and/or other devices. Similarly, while the description of FIG. 1 describes the computing device 102 as a server device, this is also a nonlimiting example. More specifically, depending on the particular exemplary embodiment, other components may be utilized and may include similar elements and/or logic.

Additionally, while the other software 188 is illustrated in FIG. 1 as including a single software component, this is also a nonlimiting example. In at least one embodiment, the other software 188 may include one or more components, embodied in software, hardware, and/or firmware.

Figure 2:
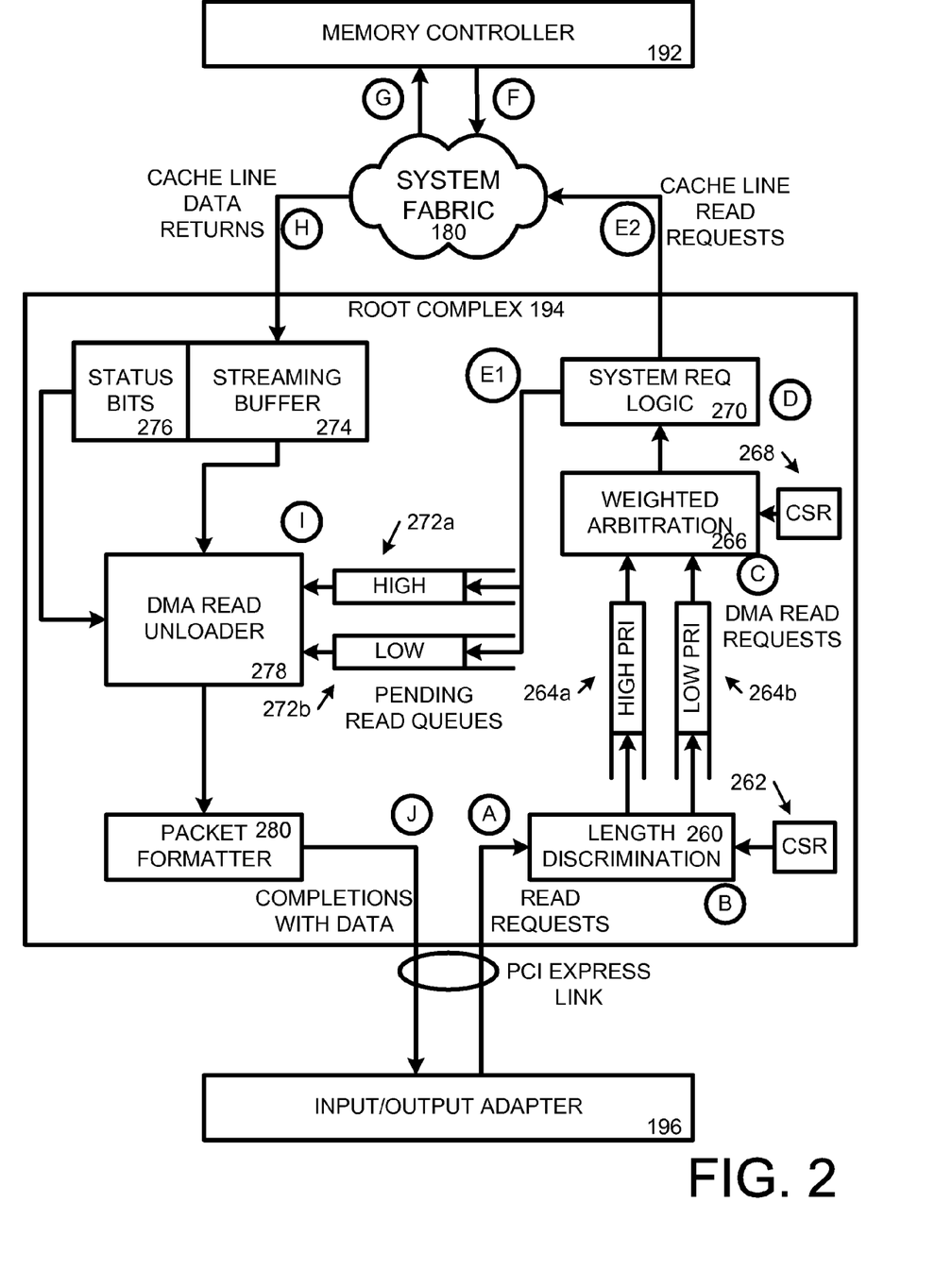
FIG. 2 depicts an exemplary embodiment of detailed view of the computing device from FIG. 1.

FIG. 2 depicts an exemplary embodiment of detailed view of the computing device from FIG. 1. As illustrated in the nonlimiting example of FIG. 2, in at least one exemplary embodiment, the I/O adapter 196 may be coupled to the root complex 194 via a PCI express link. Additionally, the root complex 194 may be coupled to the memory controller 192 via the system fabric 180.

As illustrated, the root complex 194 includes a discrimination component (e.g., length discrimination logic 260) that may be configured to determine whether an incoming request is a high priority or a low priority request. This determination can be made based on a predetermined size threshold of the length of data to be retrieved, a service level agreement (SLA), and/or other criteria. Additionally, the length discrimination logic 260 may be coupled to a first control status register (CSR) 262. The first control register may be configured to facilitate programmability of the length discrimination logic 260. As a nonlimiting example, if an administrator determines that the current configuration does not yield a desirable level of efficiency, the administrator can access the first CSR to change the criteria for routing high and/or low priority requests to the high and/or low priority queues 264a, 264b.

As discussed above, the one or more thresholds may be related to size; however, this is not a requirement. As a nonlimiting example, because in some embodiments short structure reads may have a higher priority for quick retrieval, the high priority queue 264a may be dedicated to those requests for data below a predetermined threshold. The low priority queue 264b may be configured to receive requests for larger sized data.

Similarly, in at least one exemplary embodiment, the length discrimination logic 260 may be configured to utilize a variable threshold for sorting requests to first queues 264. As a nonlimiting example, if a greater number of requests for small amount of data are received, the length discrimination logic 260 may determine to increase the threshold to access the high priority queue 264a, thereby balancing the load of the first queues 264.

Also included in the nonlimiting example of FIG. 2 are the first set of queues 264, which include the high priority queue 264a and the low priority queue 264b. The first set of queues 264 are coupled to the length discrimination logic 260. The first queues 264 may be configured to receive requests from the length discrimination logic 260 and hold the requests for transmission to a weighted arbitration logic 266. The weighted arbitration logic 266 may be configured to determine the next request to process from the first queues 264. The determination can be made based on data received from a second CSR 268. As discussed above, the requests from the first queues 264 may be retrieved in a time division multiplexing configuration. The weighted arbitration logic 266 may then retrieve the desired next request for sending to system request logic 270.

The system request logic 270 may be configured to receive the request from the weighted arbitration logic 266 and break the request into one or more cache lines for sending to the memory controller 192. The system request logic 270 may also be configured to determine bookkeeping data associated with the request. More specifically, the bookkeeping data may be configured to associate a request with data received from the memory controller 192. As a nonlimiting example, the bookkeeping data can facilitate ordering and/or conversion of the received data into a PCIe compatible format.

Also included as part of the root complex 194 is a streaming buffer 274. The streaming buffer 274 may be configured to receive the requested data from the memory controller 192 via the system fabric 180. The received data may be configured in a cache line format, where the data may be received in predetermined byte increments. Similarly, the status bits component 276 may be configured to determine status bits that indicate for each slot of the queues 264, 272, whether data is available (e.g., data has arrived from the memory controller) and whether the data is correctly ordered according to the PCIe ordering criteria.

A direct memory access (DMA) read unloader 278 may also be included in the root complex 194 and configured to receive the requested data (in cache line format) from the streaming buffer 274. Additionally, the DMA read unloader 278 can receive the bookkeeping data from second queues 272a and 272b. The DMA read unloader 278 can determine the desired order of the received cache line data for sending to the I/O adapter 196. Additionally, the ordered data can be sent to the packet formatter 280 to format the data into a PCIe compatible format. The formatted data can then be sent to the I/O adapter 196.

Figure 3:
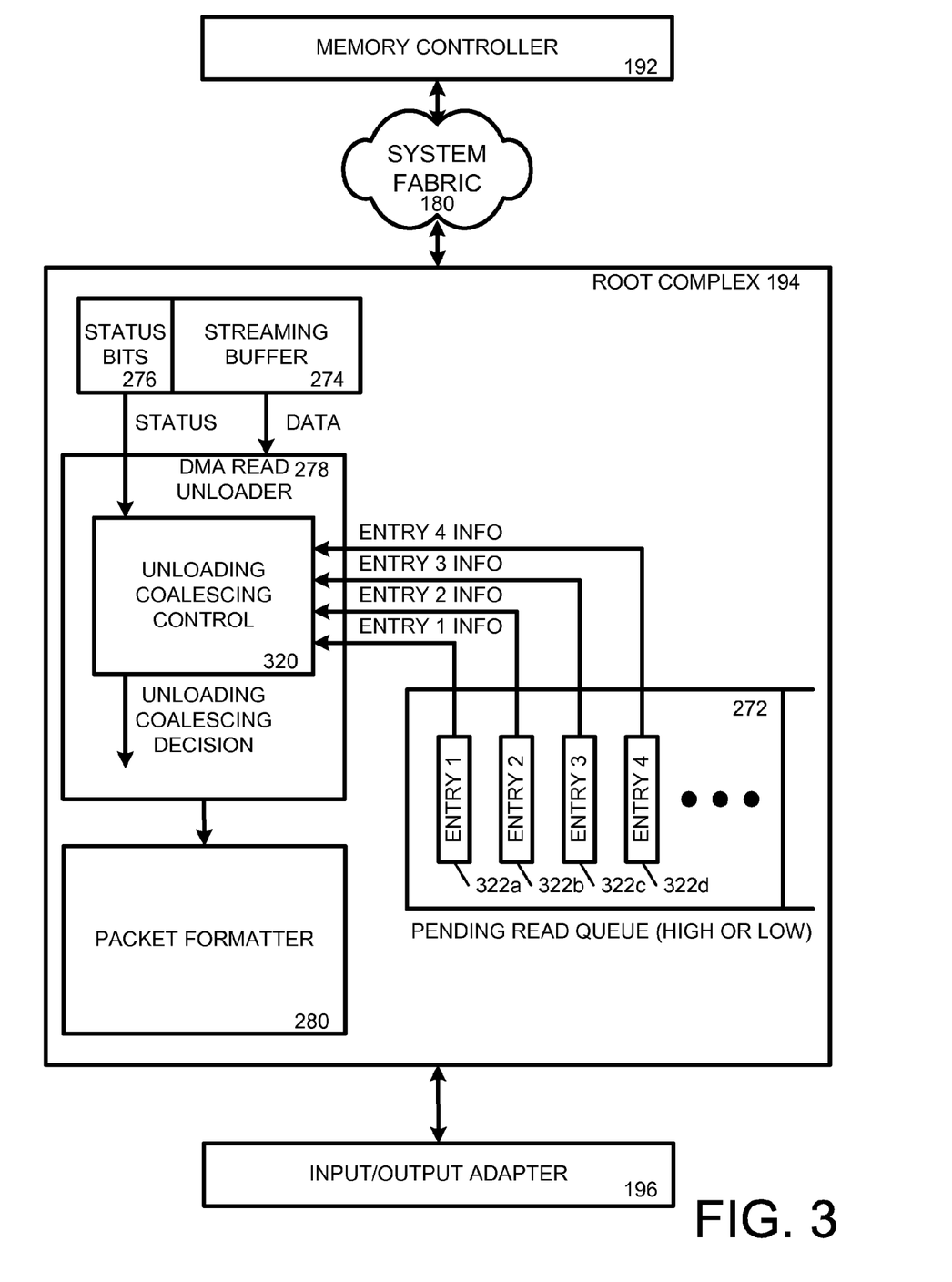
FIG. 3 depicts another exemplary embodiment of the computing device from FIG. 1.

FIG. 3 depicts additional detail of the root complex 194, similar to the diagram from FIG. 2. As discussed above, the root complex 194 may include the second queues (also referred to as the pending read queues) 272. However, as explicitly shown in FIG. 3, each of the second queues 272 may have a plurality of entries 322 that indicate the bookkeeping data. Each of the entries 322 (e.g., entry 1-entry 4) may be configured to provide to the DMA read unloader 278 data regarding whether the entry is valid (e.g., whether the entry contains a valid request to send the data from the cache line to the I/O adapter 196. Additionally, the entries 322 may be configured to provide information regarding an index of the slot in the streaming buffer 274 where the cache line data will be stored once it arrives in the root complex 194 from the memory controller 192.

Additionally, the DMA read unloader 278 may include unloading coalescing control logic 320. The unloading coalescing control logic 320 may be configured to utilize the above entry validity data and the index data from the entries 322 at the head of each pending queue 272, combined with the status bits from the streaming buffer 274 (e.g., via the streaming bits component 276). From this information, the unloading coalescing control logic 320 can determine whether the data from the cache lines referred to by the four entries 322 at the head of each pending read queue 272 is ready (e.g., retrieved and ordered) to be unloaded to the I/O adapter 196.

One should note that while four entries 322 are illustrated in the nonlimiting example of FIG. 3, this is a nonlimiting example, as any number of entries may be utilized.

More specifically, as a nonlimiting example, the unloading coalescing control logic 320 may be configured to determine that if the cache line data corresponding to entry 322*a* is not available (and/or not properly ordered for transmission via PCIe), then no cache line data is sent to the packet formatter 280 (regardless of the availability of the data for other entries 322*b*-322*d*). Additionally, in some embodiments, the unloading coalescing control logic 320 can also determine that if the cache line data corresponding to entry 322*a* is available (and ordered) but the cache line data corresponding to entry 322*b* is not available (and/or not ordered), then the cache line data corresponding to entry 322*a* may be sent to the packet formatter 280 for sending to the I/O adapter 196.

Additionally, in situations where cache line data corresponding to entry 1 322*a* and cache line data corresponding to entry 2 322*b* are available (and ordered) but the cache line data corresponding to entry 3 322*c* and entry 4 322*d* are unavailable (and/or not ordered), the unloading coalescing control logic 320 can decide to send the cache line data corresponding to entries 322*a* and 322*b* to the packet formatter to be packetized in a single packet (according to PCIe requirements) to be sent to the I/O adapter 196. Similarly, in situations where the data for the cache lines of all four entries 322 is available (and ordered), the unloading coalescing control logic 320 can decide to process all four cache lines into a single packet to be sent to the I/O adapter 196.

One should note that while certain components of FIGS. 2 and 3 are indicated as being embodied as logic, the term logic should not be construed to simply mean software. One or more of the components described in FIGS. 2 and 3 may be implemented as hardware logic. Similarly, in at least one embodiment, one or more of these components may be implemented as firmware and/or software.

Figure 4:
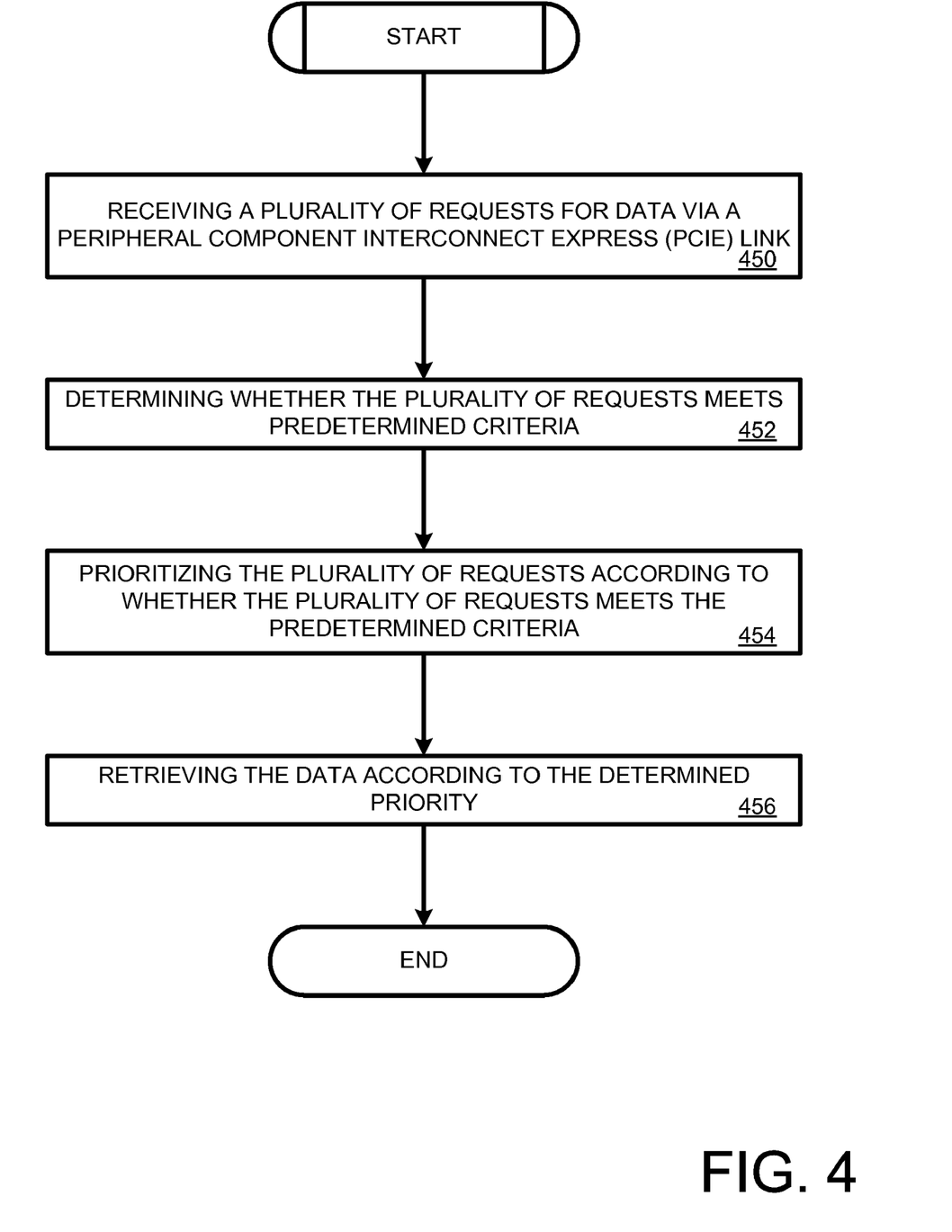
FIG. 4 depicts an exemplary embodiment of a process that may be utilized for processing a request, such from an I/O adapter, such as in the architecture from FIG. 2.

FIG. 4 depicts an exemplary embodiment of a process that may be utilized for processing a request, such from an I/O adapter 196, such as in the architecture from FIG. 2. As illustrated in the nonlimiting example of FIG. 4, the root complex 194 can receive a plurality of requests for data via a PCIe link (block 450). As discussed herein, the request can be received via the I/O adapter 196 and the requests may be received in a PCIe packet format. Additionally, the root complex 194 (e.g., via the length discrimination logic 260) can determine whether each of the requests meets predetermined criteria (block 452). More specifically, the determination can be made whether the request calls for data greater (and/or less) than a size threshold, whether the request calls for data that meets a service level agreement (SLA). Additionally, the requests can be prioritized according to whether that particular request meets the predetermined criteria (block 454). As a nonlimiting example, the requests can be prioritized based on size of the data requested. In such a configuration, data requests below a predetermined size threshold can be sent to queue 264*a*, which may be a high priority queue. If the determined size is above the threshold (and/or equal to), the request can be sent to the low priority queue 264*b*. From the first queues 264, the data can be sent to the memory controller 192 according to the determined priority. Additionally, the requested data may be retrieved according to the determined priority (block 456), such as from the memory controller 192.

Figure 5A:
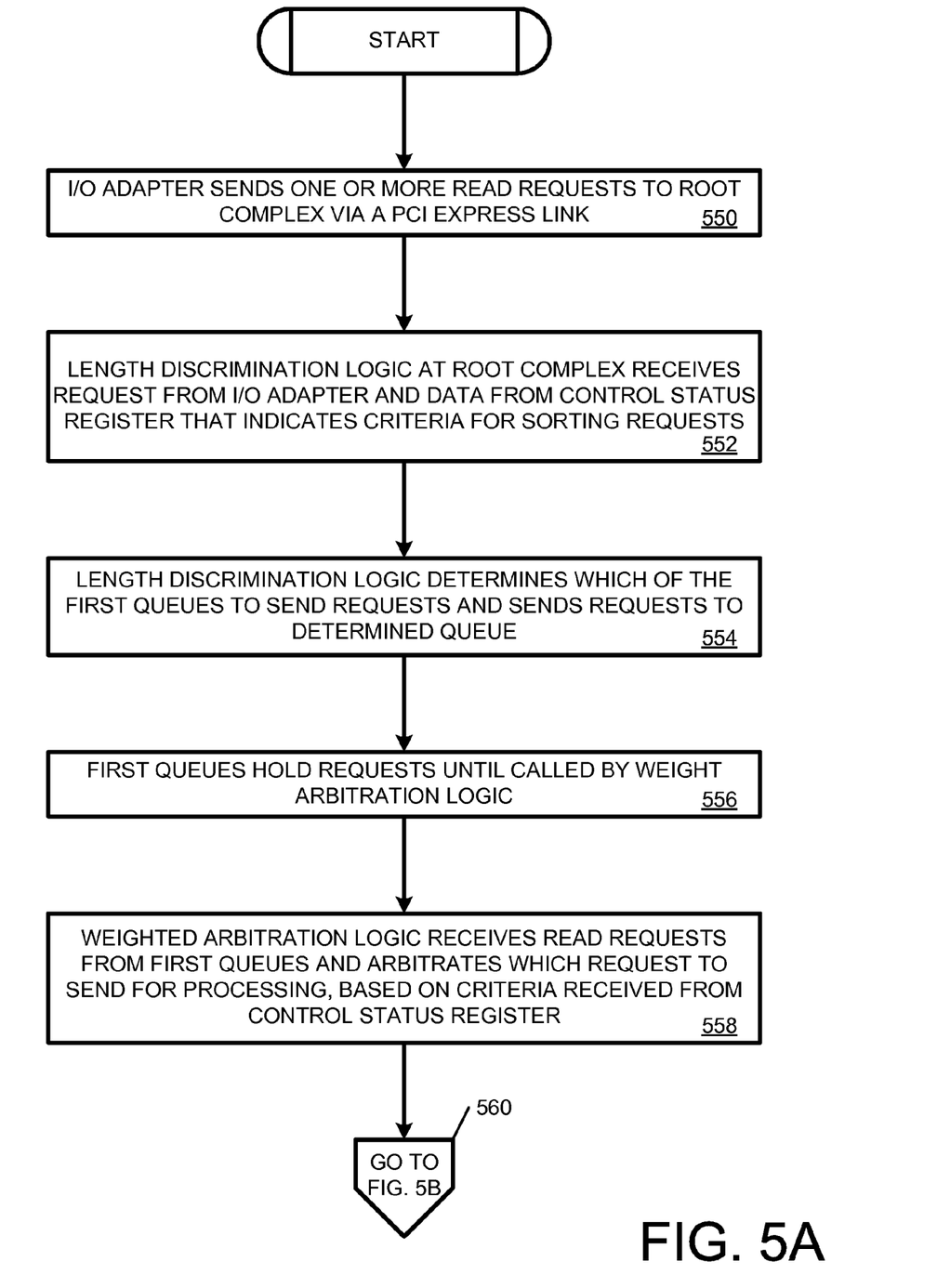
FIGS. 5A-5C depict an exemplary embodiment of a process that may be utilized for sending a request from an I/O adapter, such as in the architecture from FIG. 2.
Figure 5B:
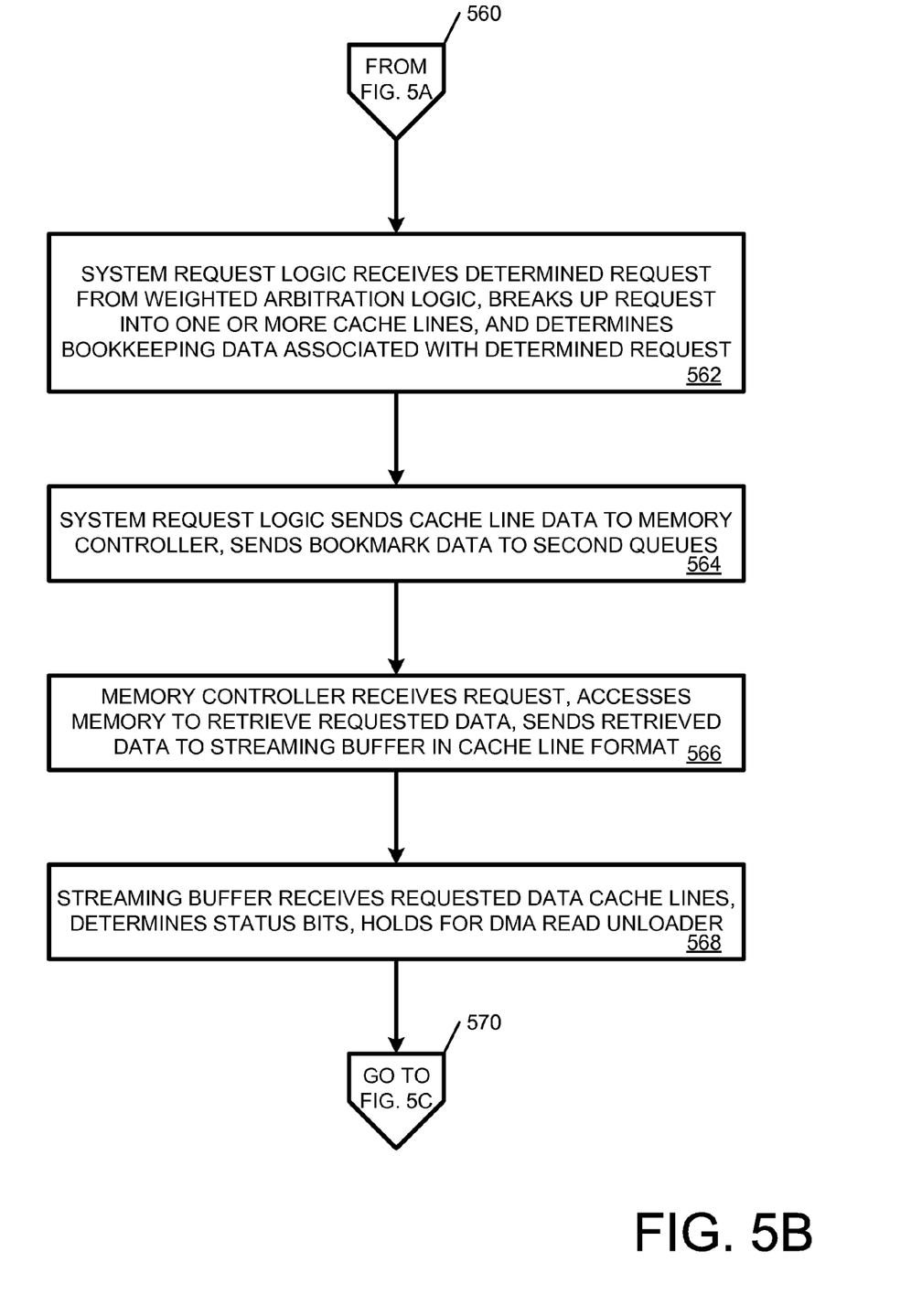
Figure 5C:
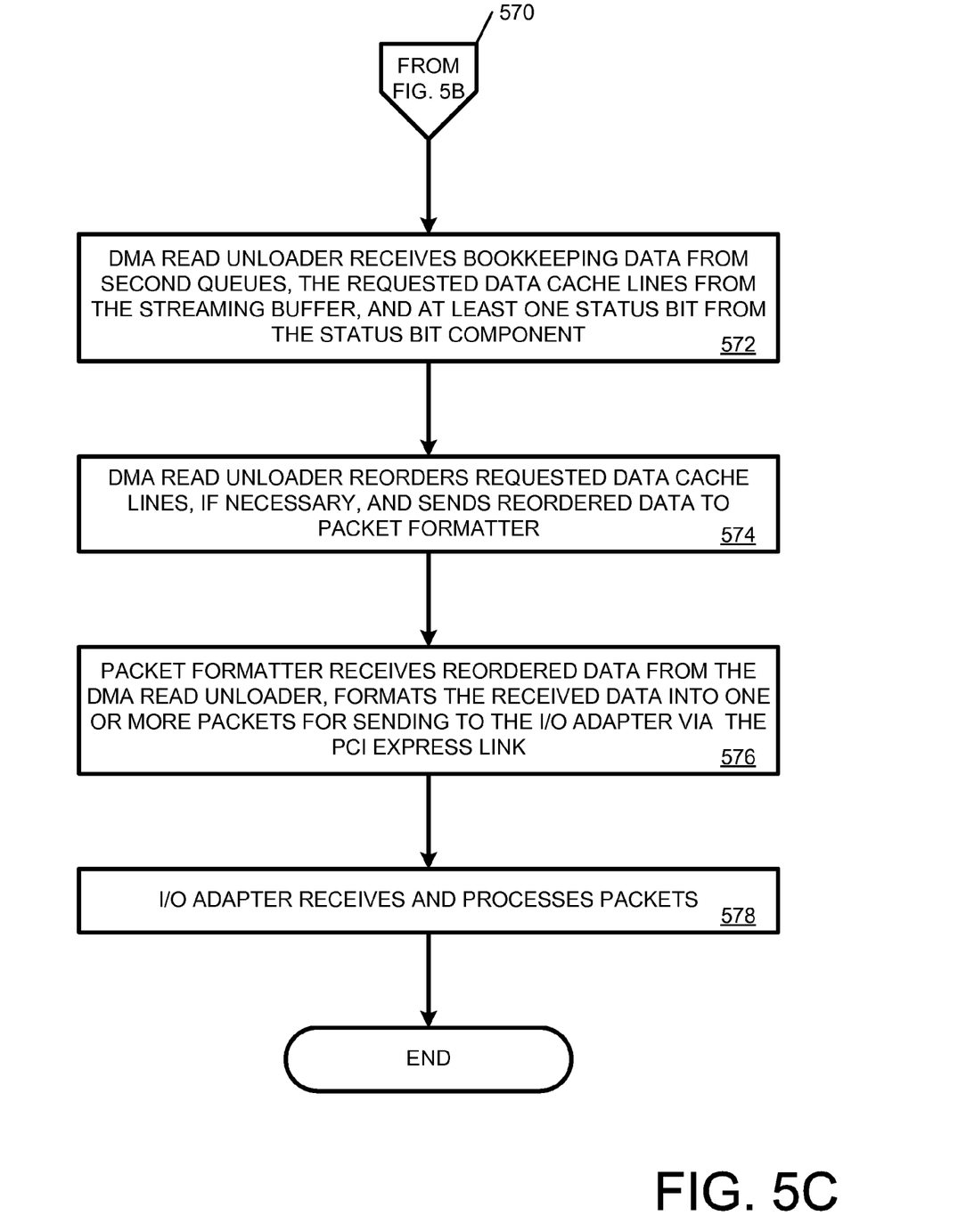

FIGS. 5A-5C depicts an exemplary embodiment of a process that may be utilized for sending a request from an I/O adapter 196, such as in the architecture from FIG. 2. As illustrated in the nonlimiting example of FIG. 5A, the I/O adapter 196 can send one or more read requests to the root complex 194 via a PCIe link (block 550). At the root complex 194, the length discrimination logic 260 can receive the request from the I/O adapter 196 and data from the CSR 262 that indicates criteria for sorting requests (block 552). From the received data, the length discrimination logic 260 can determine which of a first set of queues 264 to send the requests and sends the requests accordingly (block 554). The first queues 264 can receive the requests from the length discrimination logic 260 and hold the received requests until called by the weighted arbitration logic 266 (block 556). The weighted arbitration logic 266 can receive read requests from the first queues 264 and arbitrate which request to send for processing, based on criteria received from the second CSR 268 (block 558). The process then proceeds to jump block 560, continued in FIG. 5B.

FIG. 5B is a continuation of the process from FIG. 5A. As illustrated in the nonlimiting example of FIG. 5B, the system request logic 270 can receive the determined request from the weighted arbitration logic 266. Additionally, the system request logic can break up the request into one or more cache lines, and determine bookkeeping data associated with the determined request (block 562). The system request logic 270 can additionally send the cache line data to the memory controller 192 and send the bookmark data to the second set of queues 272 (block 564). The memory controller 192 can receive the request, access the memory component 184 to retrieve the requested data, and send the retrieved data to the streaming buffer 274 in cache line format (block 566). The streaming buffer 274 can receive the requested data cache lines, determines status bits associated with the received data, and holds the data for the DMA read unloader 278 (block 568). The process can then proceed to jump block 570.

FIG. 5C is a continuation of the process form FIG. 5B. More specifically, from the jump block 570, The DMA read unloader 278 can receive bookkeeping data from the second queues 272, the requested data cache lines from the streaming buffer 274, and at least one status bit from the status bits component 276, which depending on the particular configuration, may be part of the streaming buffer 274 (block 572). The DMA read unloader 278 can reorder the requested data cache lines if necessary and send the reordered data to the packet formatter 280 (block 574). The packet formatter 280 can receive the reordered data from the DMA read unloader 278, format the received data into one or more packets for sending to the I/O adapter 196 via the PCIe link (block 576). The I/O adapter 196 can receive and process the packets from the packet formatter 280 (block 578).

Figure 6:
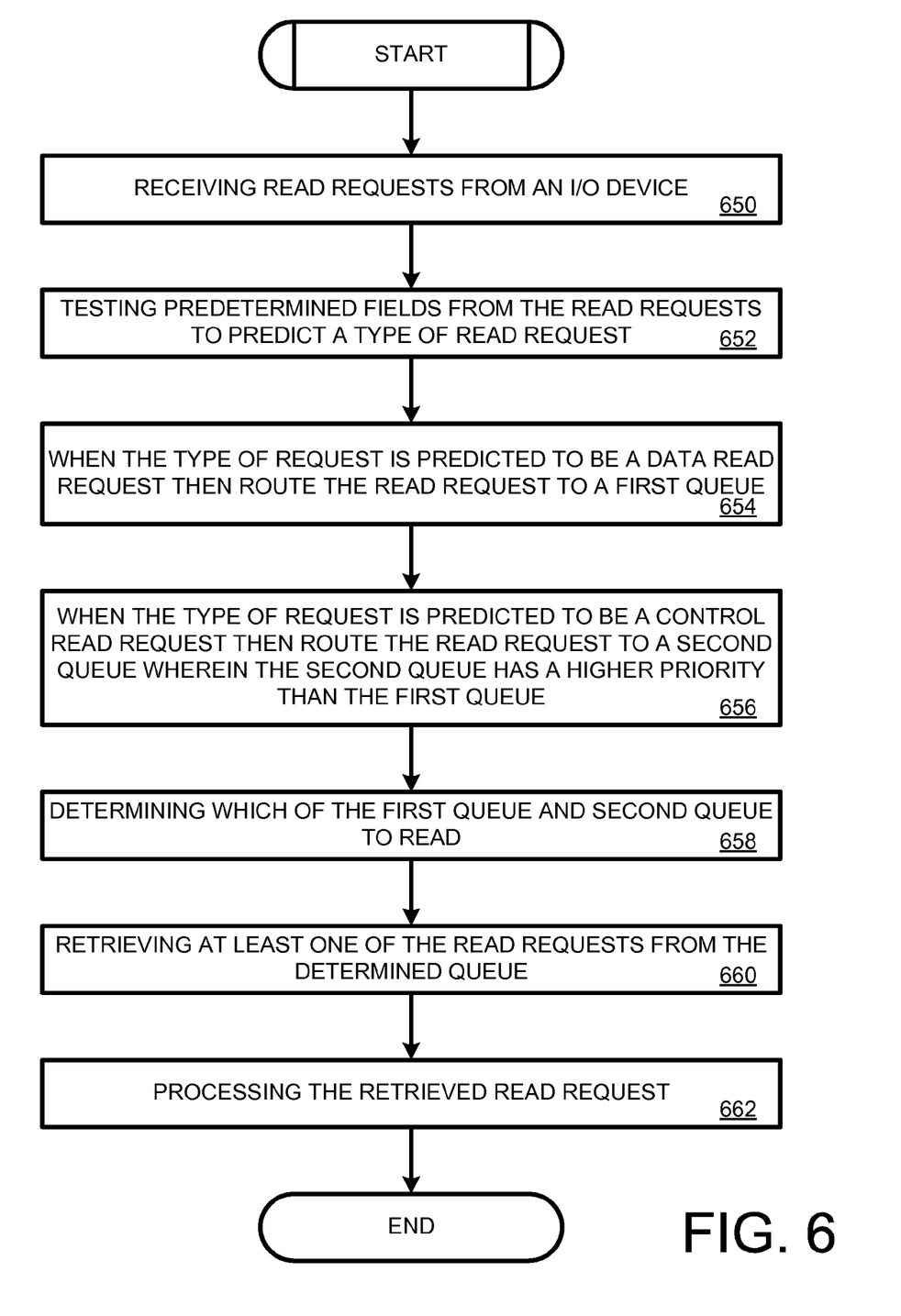
FIG. 6 depicts an exemplary embodiment of a process that may be utilized for routing a request to a queue, similar to the diagram from FIGS. 5A-5C.

FIG. 6 depicts an exemplary embodiment of a process that may be utilized for routing a request to a queue, similar to the diagram from FIGS. 5A-5C. As illustrated in the nonlimiting example of FIG. 6, read requests may be received from the I/O device (block 650). Additionally, predetermined fields from the read requests may be tested to predict a type of read request (block 652). When the type of request is predicted to be a data read request, the read request may be routed to a first queue (block 654). When the type of request is predicted to be a control read request, the read request may be routed to a second queue, where the second queue has a higher priority than the first queue (block 656). A determination can be made regarding which of the first queue and second queue to read (block 658). Additionally, at least one of the read requests can be retrieved from the determined queue (block 660). Further, retrieved read request may be processed (block 662).

Figure 7:
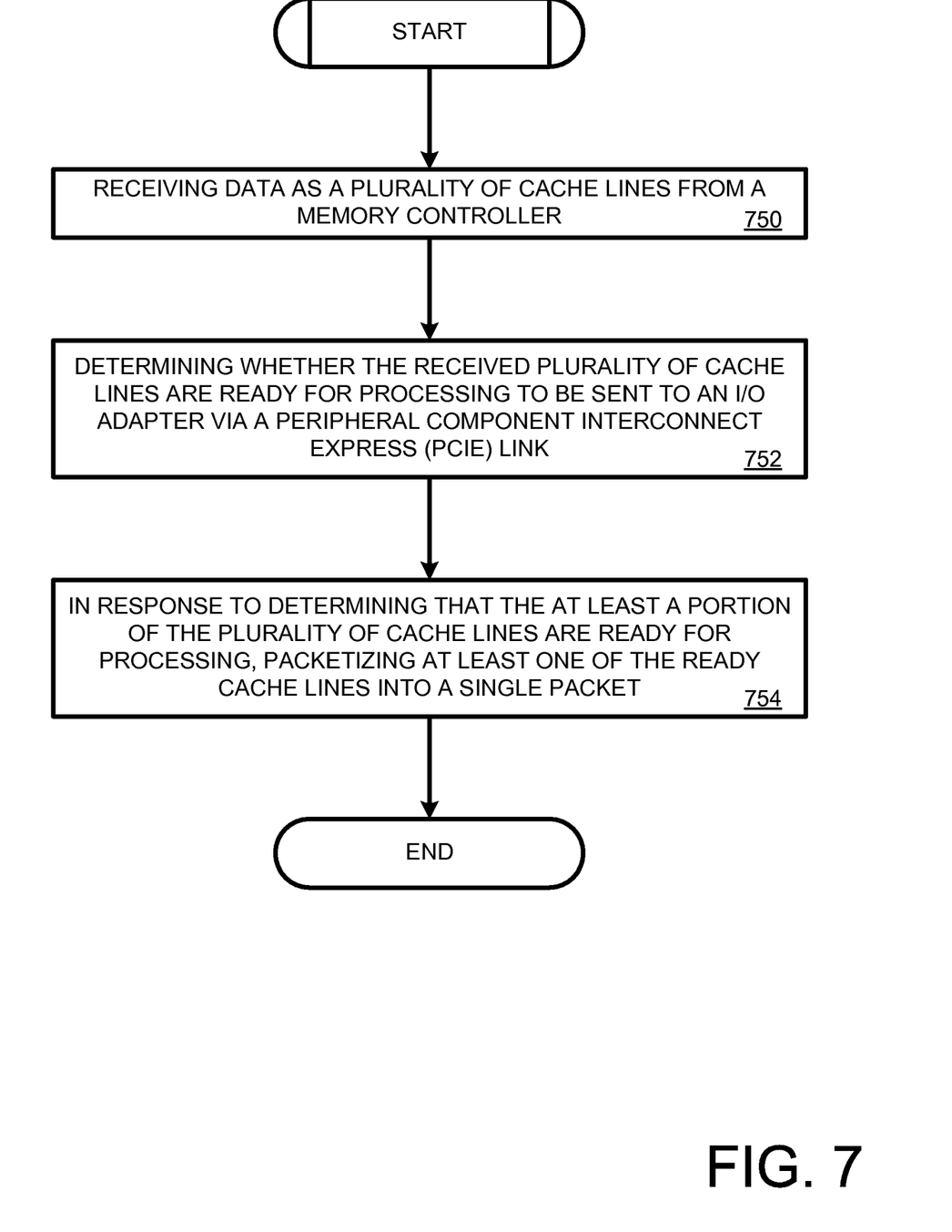
FIG. 7 depicts an exemplary embodiment of a process that may be utilized for processing data received from a memory controller, similar to the diagram from FIGS. 5A-5C.

FIG. 7 depicts an exemplary embodiment of a process that may be utilized for processing data received from a memory controller 192, similar to the diagram from FIGS. 5A-5C. As illustrated in the nonlimiting example of FIG. 7, data may be received (e.g., such as at the root complex 194, at the streaming buffer 274, and/or at the DMA read unloader 278) from a memory controller 192 (block 750). Additionally, the DMA read unloader 278 (and/or unloading coalescing control logic 320) can determine whether the received plurality of cache lines are ready for processing to be sent to the I/O adapter 196 via the PCIe link (block 752). As discussed above, this determination can be made with the addition of status bits from the streaming buffer 274 and bookkeeping data from the second queues 272. In response to determining that the at least a portion of the plurality of cache lines are ready for processing, packetizing (e.g., via the packet formatter 280) at least one of the ready cache lines into a single packet (block 754).

As discussed above, if the cache lines are ready (e.g., available and ordered), they can immediately be processed, whether or not the entire amount of data for the request is ready. This reduces latency because the root complex 194 need not stop processing if a request takes longer than expected. Additionally, if a larger amount of data than expected is ready for processing, the entirety of this data can be processed at this time. This may also improve efficiency of the root complex 194 for at least the reason that fewer packets may be sent to the I/O adapter 196, which reduces the amount of header data created and communicated.

Figure 8:
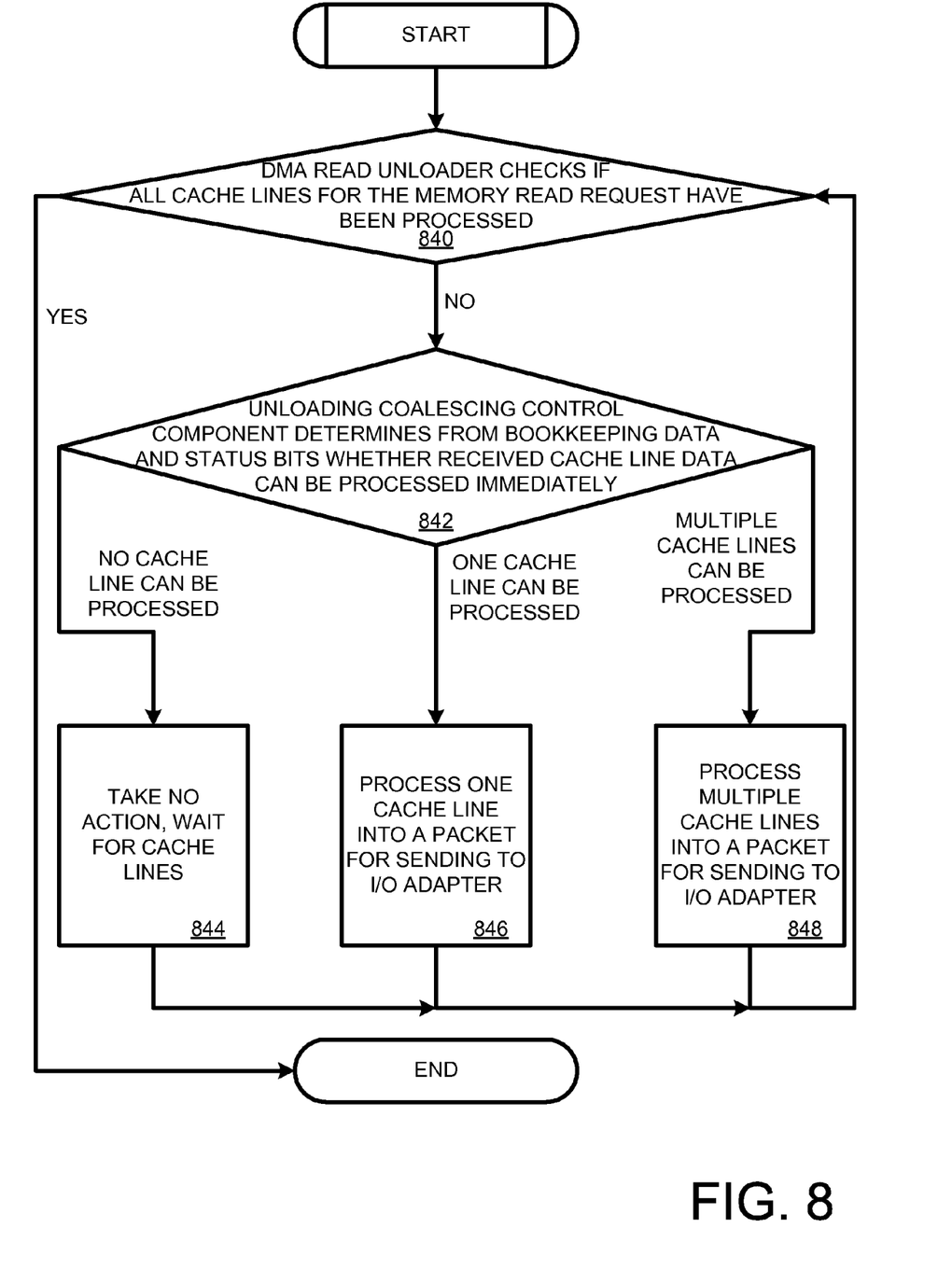
FIG. 8 depicts an exemplary embodiment of a process that may be utilized for sending data in response to a request from the I/O adapter 196, similar to the diagram from FIG. 7.

FIG. 8 depicts an exemplary embodiment of a process that may be utilized for sending data in response to a request from the I/O adapter 196, similar to the diagram from FIG. 6. As illustrated in the nonlimiting example of FIG. 8, the DMA read unloader 278 can determine whether all cache lines for the memory read request have been processed (block 840). If so, the process may end. If however, all the cache lines have not been processed, the DMA read unloader 278, via the unloading coalescing control logic 320 can determine from the bookkeeping data and status bits, whether the received cache line data can be processed immediately (block 842). More specifically, as the cache line data is reordered, various portions of the data may be ready for packetizing and/or sending to the I/O adapter 196. Accordingly, a decision may be made at various times regarding what data is ready to be sent. If no data is ready to be sent, no action may be taken and the DMA read unloader 278 can wait for additional cache lines (block 844). If however, one cache line can be processed immediately, that cache line may be processed for sending to the I/O adapter 196 and the DMA read unloader 278 can await the next cache line data (block 846). If a plurality of cache lines can be processed, the plurality of cache lines can be processed into a single packet for sending to the I/O adapter 196 (block 848).

Figure 9:
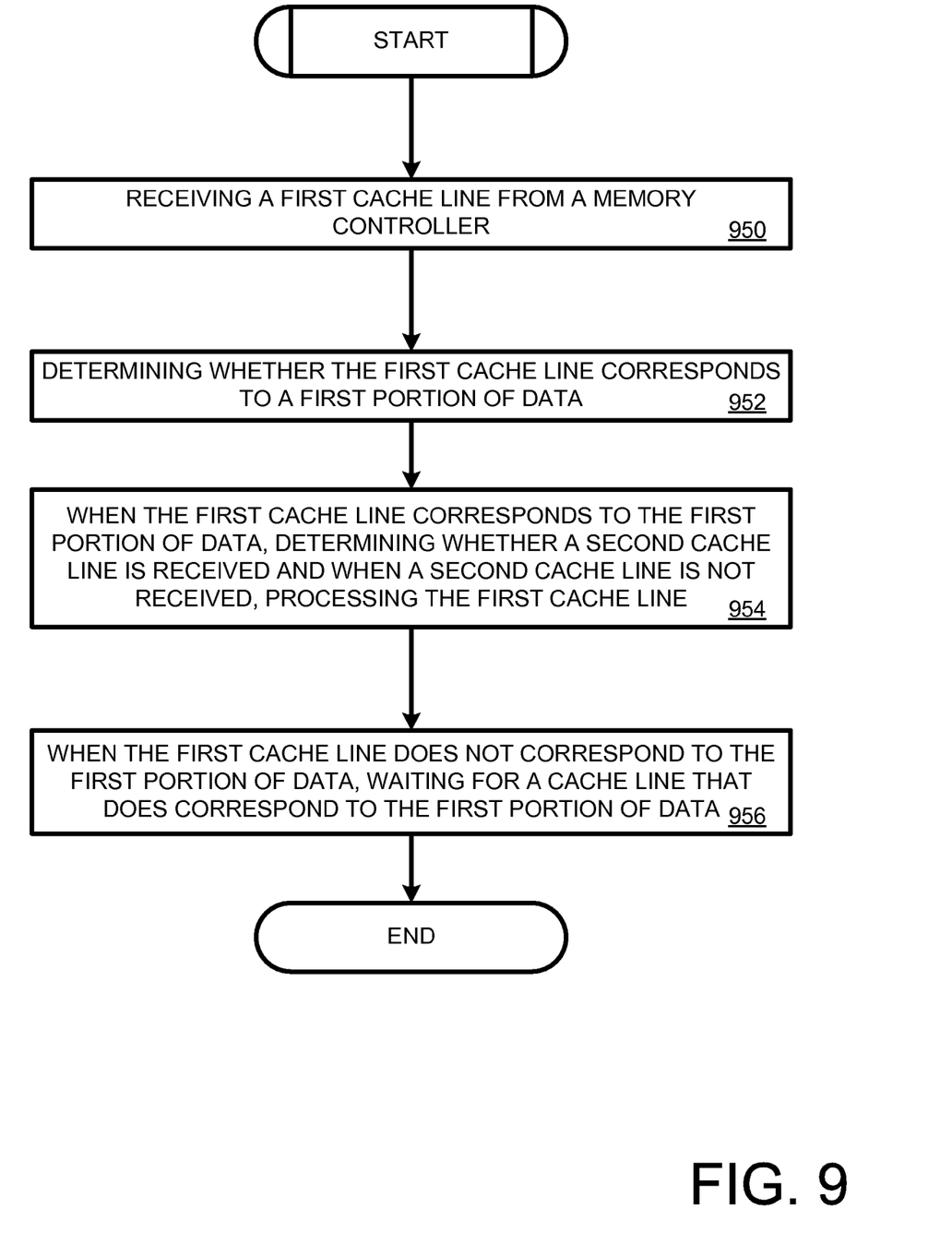
FIG. 9 depicts an exemplary embodiment of a process that may be utilized for balancing bandwidth and latency, similar to the diagram from FIG. 8.

FIG. 9 depicts an exemplary embodiment of a process that may be utilized for balancing bandwidth and latency, similar to the diagram from FIG. 8. As illustrated in the nonlimiting example of FIG. 9, a first cache line can be received from a memory controller (block 950). Additionally, a determination can be made whether the first cache line corresponds to a first portion of data (block 952). In situations where the first cache line corresponds to the first portion of data, a determination can be made whether a second cache line is received and when the second cache line is not received, processing the first cache line (block 954). Additionally, when the first cache line does not correspond to the first entry of data, waiting for a cache line that does correspond to the first entry of data (block 956). One should note that in some embodiments, the process may continue, combining cache line data into a single packet, up to a pre-programmed maximum packet size.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software and/or hardware logic. In this regard, each block can be interpreted to represent a circuit, chip, module, segment, and/or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be Therefore, at least the following is claimed:

1. A method for servicing memory read request from an input/output (I/O) device, comprising:
   receiving read requests from the I/O device;
   testing predetermined fields from the read requests to predict a type of read request, wherein the prediction of the type of the read request is not required to be based on size;
   when the type of request is predicted to be a date read request, then routing the read request to a first queue;
   when the type of request is predicted to be a control read request, then routing the read request to a second queue, wherein the second queue had a higher priority than the first queue;
   determining which of the first queue and the second queue to read;
   retrieving at least one of the read requests from the determined queue; and
   processing the at least one retrieved read request.

2. The method of claim 1, wherein the predetermined fields constitute a length field for the memory read request.

3. The method of claim 2, wherein the testing of predetermined fields constitutes comparing the tested predetermined fields to a threshold value contained in a control register that is configurable by system software.

4. The method of claim 1, wherein determining which of the first queue and the second queue to read includes time division multiplexing the read requests from the first queue and the second queue.

5. The method of claim 4, wherein the determining which of the first queue and the second queue to read includes servicing the higher priority queue a given number of times for each single servicing of the lower priority queue.

6. The method of claim 5, wherein the given number of times for servicing the higher priority queue is determined by a threshold value contained in a control register that is set by system software.

7. The method of claim 1, wherein receiving read requests includes receiving read requests via a peripheral component interconnect express (PCIe) protocol.

8. A system for servicing memory read request from an input/output (I/O) device, comprising:
   a computer processor;
   a root complex configured to receive read requests from the I/O device, the root complex comprising:
      discrimination logic for testing predetermined fields from the read requests to predict a type of read request, wherein when the type of request is predicted to be a first type, the discrimination logic routes the read request to a first queue, wherein when the type of request is predicted to be a second type, the discrimination logic routes the read request to a second queue, wherein the second queue has a higher priority than the first queue, wherein the prediction of the type of the read request is not required to be based on size; and
      arbitration logic configured to determine which of the first queue and the second queue to read, the arbitration logic further configured to retrieve at least one of the read requests from the determined queue,
   wherein the root complex is further configured to process the retrieved read request.

9. The system of claim 8, wherein the predetermined fields constitute the length field for the memory read request.

10. The system of claim 9, wherein the testing of predetermined fields constitutes comparing the tested predetermined fields to a threshold value contained in a control register that is configurable by system software.

11. The system of claim 8, wherein determining which of the first queue and the second queue to read includes time division multiplexing the read requests from the first queue and the second queue.

12. The system of claim 11, wherein the determining which of the first queue and the second queue to read includes servicing the higher priority queue a given number of times for each single servicing of the lower priority queue, and wherein the given number of times for servicing the higher priority queue is determined by a threshold value contained in a control register that is set by system software.

13. The system of claim 8, wherein receiving read requests includes receiving read requests via a peripheral component interconnect express (PCIe) protocol.

14. A system for servicing memory read requests from an input/output (I/O) device, comprising:
   means for executing computer instructions;
   means for receiving read requests from the I/O device;
   means for testing predetermined fields from the read requests to predict a type of read request, wherein the prediction of the type of the read request is not required to be based on size;
   means for routing the read request to a first queue when the type of request is predicted to be a date read request;
   means for routing the read request to a second queue when the type of request is predicted to be a control read request;
   means for determining which of the first queue and the second queue to read;
   means for retrieving at least one of the read requests from the determined queue; and
   means for processing the at least one retrieved read request.

15. The system of claim 14, wherein the predetermined fields constitute the length field for the memory read request.

* * * * *

UNITED STATES PATENT AND TRADEMARK OFFICE
CERTIFICATE OF CORRECTION

| | | |
|---|---|---|
| PATENT NO. | : 8,103,837 B2 | Page 1 of 1 |
| APPLICATION NO. | : 12/337008 | |
| DATED | : January 24, 2012 | |
| INVENTOR(S) | : Matthew B. Lovell et al. | |

It is certified that error appears in the above-identified patent and that said Letters Patent is hereby corrected as shown below:

In column 11, line 13, in Claim 1, delete "date" and insert -- data --, therefor.

In column 12, line 42, in Claim 14, delete "date" and insert -- data --, therefor.

Signed and Sealed this
Thirtieth Day of October, 2012

David J. Kappos
*Director of the United States Patent and Trademark Office*